United States Patent [19]

Johnson

[11] Patent Number: 4,552,094

[45] Date of Patent: Nov. 12, 1985

[54] HORSE STALL CONSTRUCTION

[75] Inventor: Larry Johnson, Sterling, Ill.

[73] Assignee: Lawrence Brothers, Inc., Sterling, Ill.

[21] Appl. No.: 469,240

[22] Filed: Feb. 24, 1983

[51] Int. Cl.[4] .......................... A01K 1/00; E06B 3/70

[52] U.S. Cl. .......................... 119/27; 52/825; 52/823; 49/409

[58] Field of Search .......................... 52/106, 825, 648, 660, 52/656, 455, 633, 823; 119/27, 16, 18, 17; 49/409, 501

[56] References Cited

U.S. PATENT DOCUMENTS

| | | | |
|---|---|---|---|
| 2,996,161 | 8/1961 | Etling | 52/475 |
| 3,451,153 | 6/1969 | Dohanyos | 52/656 |
| 3,802,393 | 4/1974 | Naylor | 119/27 |
| 3,949,526 | 4/1976 | Sherlock | 49/501 |
| 4,030,246 | 6/1977 | Naylor | 49/501 |
| 4,161,845 | 7/1979 | Naylor | 49/380 |
| 4,182,080 | 1/1980 | Naylor | 49/410 |
| 4,273,072 | 6/1981 | Choisel | 119/27 |
| 4,305,229 | 12/1981 | Naylor | 49/380 |

FOREIGN PATENT DOCUMENTS

| | | | |
|---|---|---|---|
| 1158661 | 6/1958 | France | 58/825 |
| 8005455 | 5/1982 | Netherlands | 52/633 |

*Primary Examiner*—John E. Murtagh

*Assistant Examiner*—Kathryn Ford

*Attorney, Agent, or Firm*—Trexler, Bushnell & Wolters, Ltd.

[57] ABSTRACT

There is disclosed a door or wall construction which comprises vertically spaced upper and lower horizontal frame members and horizontally spaced vertical side frame members coupled with the upper and lower frame members to define a rectangular frame. A panel is joined with the lower frame member and side frame members to define a lower door portion. All of the frame members comprise elongate channels having substantially identical transverse, U-shaped cross sectional-dimensions and are oriented with open faces of the U-shaped cross sections facing inwardly, which open faces are dimensioned for embracing at least outer edge portions of the panel. A novel grill structure is also disclosed which forms an upper door portion. The grill structure comprises a plurality of vertically oriented, horizontally spaced elongate rods and a pair of elongate, U-shaped channels dimensioned for embracing and overlying the respective inwardly facing surfaces of the upper frame member and the second intermediate frame member. The channels include a plurality of spaced apart sleeves for receiving and retaining opposite end portions of the rods.

7 Claims, 8 Drawing Figures

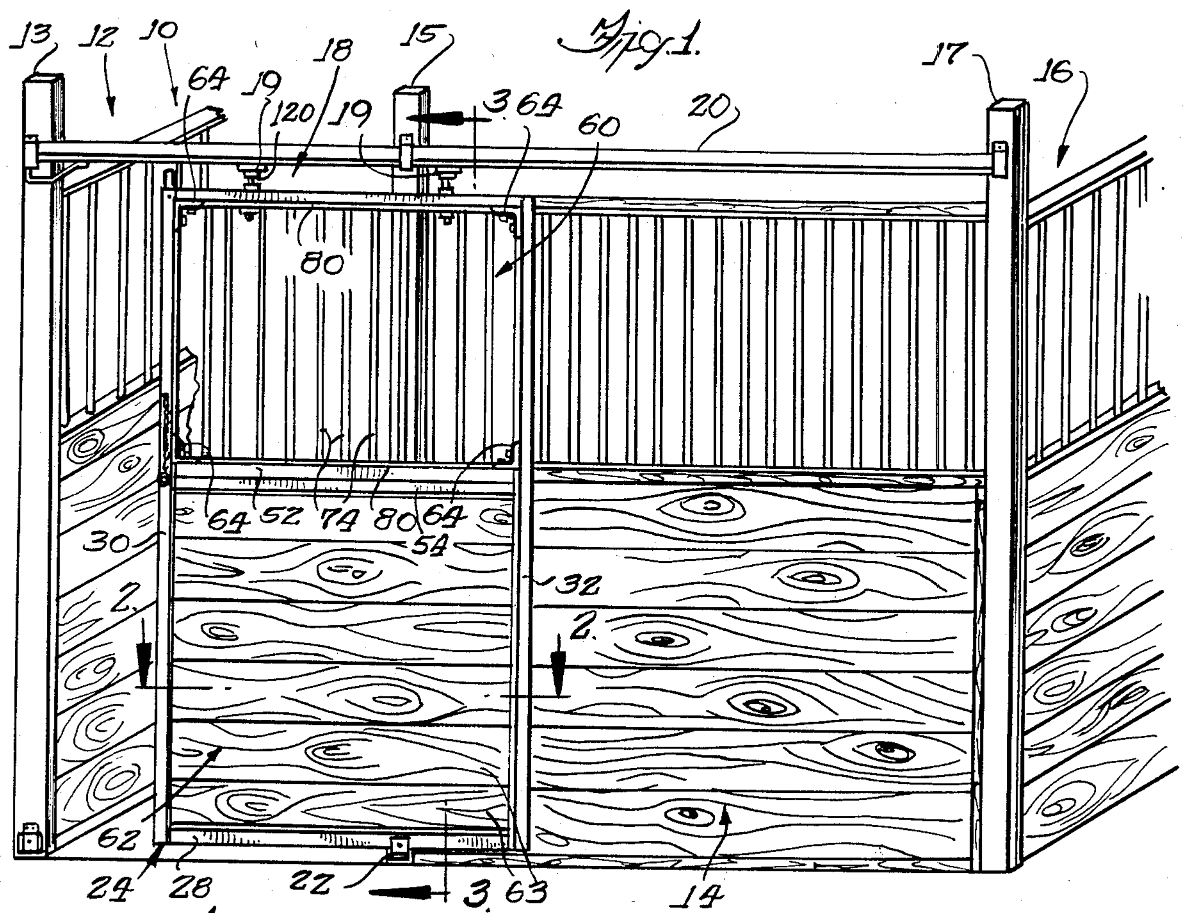
Fig.1.
13
12
10
64
19
120
18
15
19
3
64
60
20
17
16
80
64
52
74
80
64
54
30
32
2.
2.
62
24
28
22
3
63
14
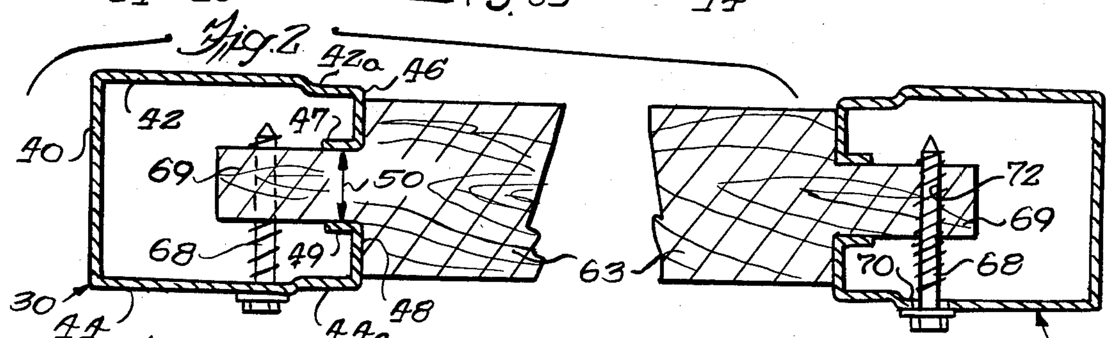
Fig.2.
42a
46
42
47
40
69
50
68
49
30
44
44a
48
63
72
69
70
68
32
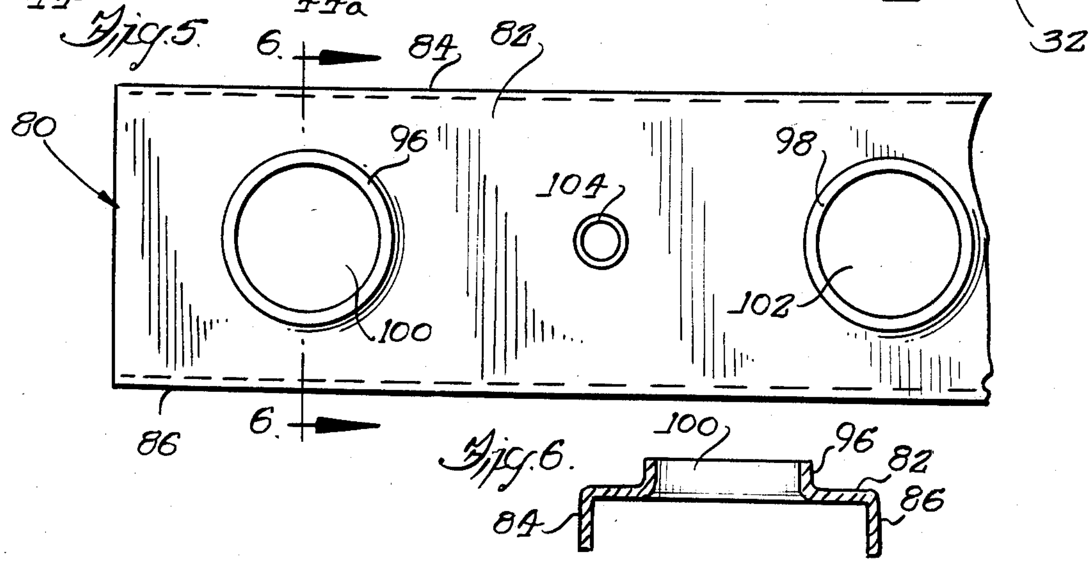
Fig.5.
6.
84
82
80
96
98
104
100
102
86
6.
Fig.6.
100
96
82
86
84

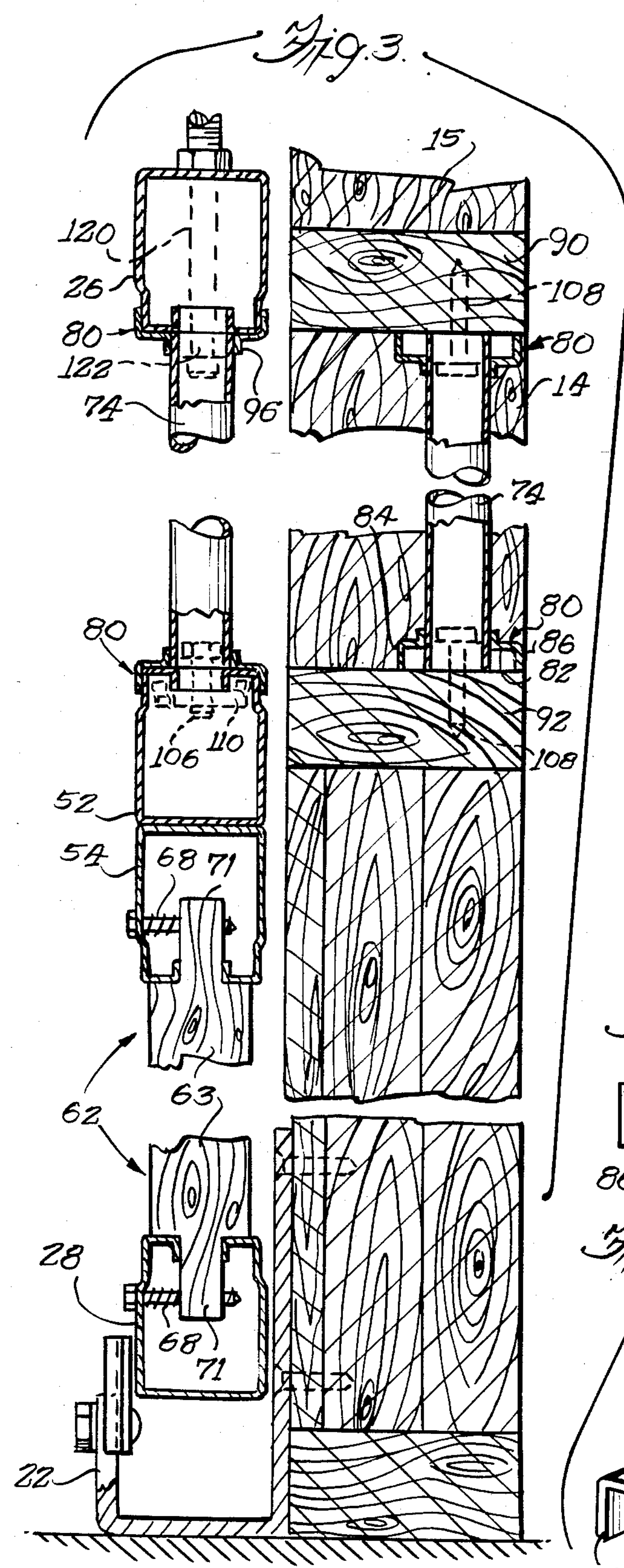
Fig.3.
15
120
26
90
108
80
80
122
14
74
96
74
84
80
80
86
82
106
110
92
108
52
54
68 71
62
63
28
68
71
22
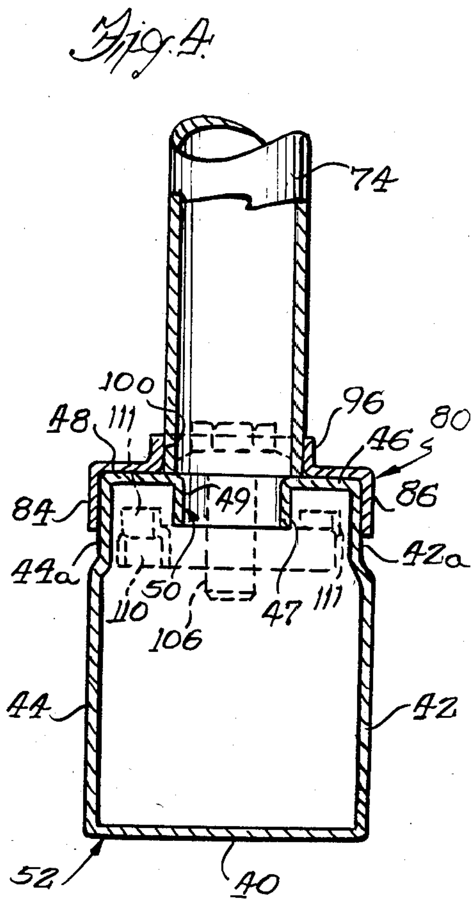
Fig.4.
74
100
96
80
48
111
46
84
49
86
44a
42a
50
110
47
111
106
44
42
52
40
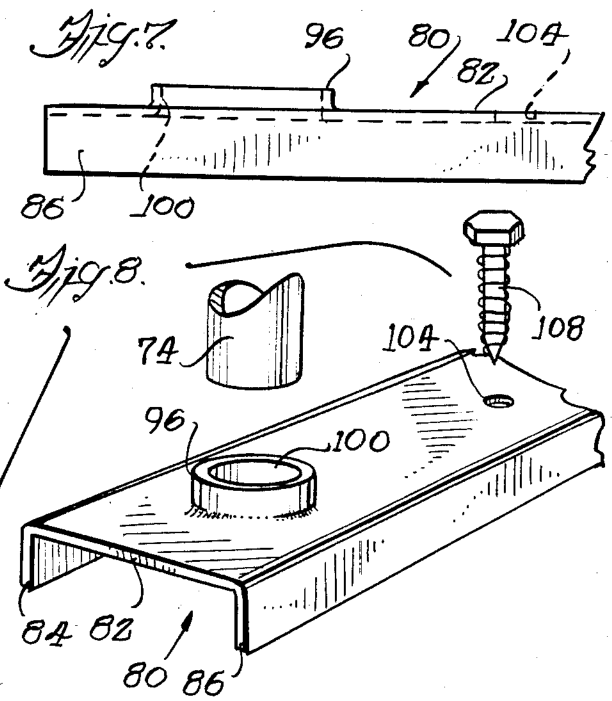
Fig.7.
96
80
104
82
86
100
Fig.8.
108
74
104
96
100
84
82
80
86

HORSE STALL CONSTRUCTION

BACKGROUND OF THE INVENTION

This invention is directed generally to novel structure for forming an enclosure such as a horse stall or horse-box. More particularly, the invention is directed to a novel grill or grate structure useful in both sliding door panels and fixed wall sections of such a horse stall, as well as a novel frame-and-panel construction, including such a grate or grill, for a door portion of the horse stall.

Structures for the construction of enclosures such as horse stalls are generally known in the art. Two such structures are shown for example in U.S. Pat. No. 3,802,393 to Naylor, and U.S. Pat. No. 4,273,072 to Choisel. It is desirable in such structures to provide relative ease of assembly of the various parts. To this end, the above-mentioned patent to Choisel emphasizes a pre-fabricated structure which may be readily assembled. However, there is room for yet further improvement.

Additionally, it is desirable in such horse stalls or other animal enclosures to avoid any protruding edges, corners or other sharp protruding parts so as to minimize the danger of injury to the animals.

OBJECTS AND SUMMARY OF THE INVENTION

Accordingly, it is a general object of the invention to provide a novel and improved construction for forming an enclosure such as a horse stall.

A more specific object is to provide such a construction which employs relatively few and standardized parts to facilitate assembly thereof.

Yet a further object is to provide a construction in accordance with the foregoing objects which is relatively simple and inexpensive and yet reliable over a long service life.

In accordance with one aspect of the invention, there is provided a grill construction comprising a plurality of elongate rods and a pair of elongate, U-shaped channel members, each including a plurality of spaced apart sleeves for receiving and retaining opposite end portions of said rods so as to mount said rods in parallel, spaced apart condition.

In accordance with another aspect of the invention there is provided a door or wall panel construction comprising vertically spaced upper and lower horizontal frame members, horizontally spaced vertical side frame members coupled with said upper and lower frame members to define a rectangular frame; panel means joined with said lower frame member and with each of said side frame members to define a lower portion of the door construction; an intermediate horizontal frame member; and a grill structure of the type set forth above disposed intermediate the upper frame member and intermediate frame member to define an upper portion of the panel construction.

In accordance with another aspect of the invention there is provided a door or wall construction comprising vertically spaced upper and lower horizontal frame members; horizontally spaced vertical side frame members joined with said upper and lower frame members to define a rectangular frame; and panel means coupled with said lower frame member and with each of said side frame members to define a lower door portion; wherein all of the frame members comprise elongate members having substantially identical transverse, U-shaped cross sectional dimensions, said frame members being oriented with open faces of said U-shaped cross sections thereof facing inwardly with respect to the rectangular frame defined thereby, and dimensioned for embracing at least outer edge portions of the panel means for defining the coupling of the panel means to the lower and side frame members.

BRIEF DESCRIPTION OF THE DRAWINGS

The foregoing, as well as other objects, features and advantages of the invention will be more readily appreciated upon reading the following detailed description of the illustrated embodiment, together with reference to the drawings wherein:

FIG. 1 is a partial perspective view of an enclosure such as a horse stall constructed in accordance with the invention;

FIG. 2 is an enlarged sectional view, partially broken away and taken generally along the line 2—2 of FIG. 1;

FIG. 3 is an enlarged sectional view, partially broken away, and taken generally along the line 3—3 of FIG. 1;

FIG. 4 is a further enlarged view of a portion of FIG. 3;

FIG. 5 is a partial top plan view of a novel channel member in accordance with the invention;

FIG. 6 is a sectional view taken generally along the line 6—6 of FIG. 5;

FIG. 7 is a side elevation of a portion of the channel of FIGS. 5 and 6; and FIG. 8 is a perspective view of a portion of the channel of FIGS. 5 through 7, together with a cooperating fastener member and a bar, illustrating partial assembly of a grill portion of the horse stall of FIG. 1.

DETAILED DESCRIPTION OF THE ILLUSTRATED EMBODIMENT

Referring now to the drawings and initially to FIG. 1, there is illustrated a horse stall constructed in accordance with the invention and designated generally by the reference numeral 10. While the invention may be useful in constructing other similar enclosures, the description thereof will be facilitated by specific reference to the construction of a horse stall such as the horse stall 10.

In accordance with conventional practice, the horse stall 10 comprises a plurality of fixed wall sections designated generally by reference numerals 12, 14 and 16, and a movable door panel designated generally by the reference numeral 18. These fixed wall sections 12, 14 and 16 are mounted to suitable end and corner uprights or posts 13, 15, 17. These posts 13, 15 and 17 also mount an overhead track 20. This movable door panel is preferably a sliding door panel and as such, is suspended from the overhead track 20. Further in accordance with conventional practice, the overhead track 20 carries a suitable laterally movable hanger assembly 19 that is movable along the track 20 and suspends the door panel 18 thereon. Additionally, a lower guide member 22 may be provided which maintains the door panel 18 in proper position during sliding movement.

Referring also to FIGS. 2 and 3, novel features of the construction of the door panel 18 will now be described. The door panel includes a substantially rectangular frame construction designated generally by the reference numeral 24. This frame 24 is constructed of vertically spaced upper and lower horizontal frame member 26, 28 and horizontally spaced vertical side frame members 30 and 32. Departing from convention and in accordance with a feature of the invention, all of these frame members 26, 28, 30 and 32 comprise elongate members having substantially identical transverse U-shaped cross sectional dimensions. In this regard, attention is directed to FIG. 2 wherein a transverse cross section of one such frame member 30 is illustrated.

The frame member 30 comprises a base wall or web portion 40 which integrally joins a pair of substantially parallel sidewalls 42 and 44 which are formed at substantially right angles to the base wall or web 40. These sidewalls 42 and 44 are inwardly recessed or stepped somewhat at end portions thereof remote from the base wall or web 40 to form a pair of substantially co-extensive and parallel recessed portions **42*a* and 44*a*. Extending from these recessed portions 42*a* and 44*a* are a pair of integrally formed composite inwardly facing flange members 46 and 48 which serve to define the open face of the U-shaped configuration of the member 30. In this regard, each composite flange member 46, 48 includes an inwardly extending portion 47 and 49, respectively. The flange members 46 and 48 extend substantially parallel to the base wall 40, with the flange portions 47 and 49 thereby extending inwardly of the open face of the U-shaped channel 30. The elongate opening thus defined is relatively narrow and designated by the reference numeral 50, and extends the full length of the frame member 30. Also through employment of the inwardly turned flange portions 47 and 49 any sharp edges are disposed inwardly of the frame member 30. This fact coupled with the narrow dimensions of the opening 50** will prevent injury to the animal and avoids the need for protective sleeves, or the like, as required by certain prior art construction. The frame members thus far described are substantially identical in configuration with the frame members described in the copending application of the inventor Larry Johnson, Ser. No. 453,692 filed Dec. 27, 1982, to which reference is invited.

The door panel 18 includes an additional pair of intermediate frame members 52, 54 which extend horizontally between frame members 30 and 32 at a desired location intermediate upper frame member 26 and lower frame member 28. These intermediate frame members 52 and 54 are of the same U-shaped configuration as the previously mentioned frame members, and are positioned in adjacent superposed relation, with the open faces thereof disposed oppositely as best seen in FIG. 3. The adjacent frame member 52 and 54 thus serve generally to divide the door panel 18 into upper and lower portions. The upper portion of the door panel 18 includes a grill or grate construction designated generally by the reference numeral 60 which will hereinafter be more fully described. The lower or bottom portion of the door panel 18 comprises a solid wall portion designated generally by the reference numeral 62, and comprised preferably of a plurality of board members 63.

The upper horizontal frame member 26 is joined to the spaced, vertical frame member 30 and 32 by a pair of right angle bracket members 64. Correspondingly, the uppermost intermediate frame member 54 is also joined to the vertical frame member 30 and 32 by a second pair of bracket members 64. The lower horizontal frame member 28 and the remaining intermediate frame member 54 are interlocked with the board member 63 which serve to define the wall portion 62, and which boards 63 are in turn connected to the vertical frame members 30 and 32. The manner by which the various frame members are interconnected to the lower wall portion 62 is illustrated in FIGS. 2 and 3 and will be discussed hereinafter.

In accordance with a further feature of the invention, the lower wall portion 62 interfits with the respective open faces of the vertical frame members 30 and 32, as best viewed in FIG. 2, and also with the open faces of the frame members 28 and 54 as best viewed in FIG. 3. In this regard, the lower wall portion 62 may comprise either a single panel or a plurality of boards 63 as illustrated in FIG. 1. With reference to FIG. 2, preferably, the respective boards 63 are formed with reduced end portions that define tongue-like projections 69, which interfit within or are embraced by the respective flange portions 47 and 49 defining the open face 50 of the respective channels 30 and 32. Further, as shown in FIG. 3 the upper horizontal edge of the uppermost board 63, and the lower horizontal edge of the lowermost board 63 which make up the wall portion 62, also define laterally extending tongue-like projections 71 that are interfitted within the grooves provided by the elongate opening 50 in the open face of the intermediate frame member 54 and the lower frame member 28. Additionally, suitable fastener means, such as woodscrews 68, are inserted through bores 70 in the frame members 30, 32, etc., to engage the tongue-like projections 68 and 71 received within the open faces 50, thereby securing the boards 63 to the various frame members. These bores 70 and mating fasteners 68 may be provided at suitable intervals about the outer periphery of the various frame members.

Referring now also to the remaining FIGS. 5 through 8, in accordance with another feature of the invention, novel structure provides the grill construction 60 for the door 18 and wall sections 12, 14 and 16. In this regard, it will be noted that each of the fixed wall sections 12, 14 and 16 comprise similar upper grill constructions also designated 60. However, these wall sections are preferably framed in wood, rather than by the U-shaped frame members such as those comprising the door 18 previously described. The novel grill construction to be described next, however, is substantially similar for both the door panel 18 and the fixed wall sections 12, 14, 16.

In this regard, each of these grill structures 60 comprises a plurality of substantially identical, elongate rod-like members or bars 74. In the illustrated embodiment these rod-like members are substantially cylindrical, tubular members. However, solid rods or bars, as well as rods or bars of other than cylindrical configuration may be utilized without departing from the invention. In accordance with a feature of the invention, novel retaining channel members 80 are provided for mounting a plurality of these rods or bars 74 in substantially parallel, spaced apart position to define the grill structure 60. In the illustrated embodiment, these bars or rods are substantially vertically oriented and evenly spaced. However, other orientations and spacings may be effected without departing from the invention.

A pair of substantially identical channel members 80 are utilized in conjunction with the grill structure 60 of the door member 18 and each of the side wall sections 12, 14, and 16. With respect to the door panel 18, each channel member 80 has a cross-sectional, U-shaped configuration adapted to closely interfit about the outer surfaces of the recessed portions **42*a*, 44*a* of the respective frame members as illustrated in FIG. 3 and FIG. 4, for example. In this regard, each channel member 80 comprises a substantially U-shaped elongate section defined by a web or base wall portion 82 and integrally joined respective side wall portions 84 and 86, disposed at substantially right angles. The height of respective side wall portions 84, 86 is preferably somewhat less than the corresponding dimension defined by respective recessed side wall portions 42***a,* 44*a* of the frame member for interfitting therewith in the manner illustrated in FIGS. 3 and 4.

The base wall or web portion of each channel 80 is provided with a plurality of coaxially spaced outwardly extending sleeve portions 96, 98, FIG. 5. The inner surfaces of the respective sleeves 96, 98 are configured to complimentarily receive end portions of respective rods or bars 74 therein. In the illustrated embodiment, these sleeve members 96, 98 are defined by generally annular outward extensions of the material of the web 82 about corresponding through bores 100, 102, etc., formed therethrough. Such through bores and corresponding sleeves may readily be formed by any of a number of relatively simple and inexpensive operations. As can be seen in FIG. 3, the diameter of the through bores 100, 102 and that of the rods 74 are greater than the width of the opening 50 defined in the open face of the frame member. As such the end of rod 74 will abut the outer surface of the frame member and cannot enter the opening 50.

With respect to the fixed wall sections, such as wall section 4, the grill construction 60 for these wall sections is best viewed in the right hand portion of FIG. 3. In this regard a pair of channel members 80 are mounted in engagement with ledge boards 90 and 92 which define the upper, open portion of the wall section and also frame the opening for the grill 60. The ends of the rods 74 are disposed within the sleeve portions 96, 98, etc., and abut the respective ledge boards to limit inward movement.

Suitable fastening means are provided for mounting the channels 80 to the respective frame members 26, 52, or 90, 92. In the illustrated embodiment, the fastening means are accommodated by providing one or more additional, smaller through bores 104 at intervals along the length of the web portion 82. These bores 104 are dimensioned for accommodating threaded fasteners 106 with respect to the channel member 52 and wood screws 108 with respect to ledge boards 90 and 92. Further with respect to coupling of the channel 80 with the inwardly facing surface of the metal frame member 52, a suitable mating internally threaded nut member 110 is utilized in conjunction with fastener 106. The fastener 110 comprises a generally elongate member having a through and preferably central threaded aperture for engaging the threads of the threaded fastener 106. Additionally, the member 110 is dimensioned for abutting the interior surfaces of the frame member, and also include end tabs 111 which are engaged behind the flange portions 47 and 49 of the channel 52 to assure secure engagement of channel 80 therewith upon advancement of the threaded fastener 106, as shown in FIG. 4.

Referring initially to FIG. 3, the upper frame member 26, is secured to the retaining channel member 80 by an elongate threaded fastener member 120 which preferably comprises a portion of the hanger assembly 19, as illustrated in FIG. 1. A mating internally threaded nut 122 is engaged with the elongate threaded member 120 to effect securement of channel 80 with the inwardly facing surface of channel 26. The threaded member 120 extends through one of the apertures 104 provided in the web portion 82 of channel 80 in the same fashion as previously described relative to the fasteners 106 and 108.

What has been illustrated and described herein is a novel and improved construction for an enclosure such as a horse stall. It should be noted that with regard to the door panel 18, and the metal frame members 26, 28, 30, etc., which are used to construct this door panel, the sharp corners or edges of these frame members are disposed internally thereof. Thus the reverse-bent flanges 46, 47 and 48, 49 not only define the elongate openings 50 for reception of the tongues 69 on boards 63, but also serve to eliminate any exterior sharp edges which could result in injury to the animals.

While the invention has been described herein with reference to a preferred embodiment, the invention is not limited thereto. Those skilled in the art may devise various changes, alternatives and modifications upon reading the foregoing description. The invention includes such changes, alternatives and modifications insofar as they fall within the spirit and scope of the appended claims.

The invention is claimed as follows:

1. A construction for a door or wall of a horse stall, or the like, comprising: vertically spaced upper and lower horizontal frame members; horizontally spaced vertical side frame members coupled with said upper and lower frame members to define a rectangular frame; and panel means coupled with said lower frame member and with each of said side frame members to define a lower door portion; wherein all of said frame members comprise elongate members having substantially identical transverse, U-shaped cross sectional-dimensions; said channel members being oriented with open faces of said U-shaped cross sectional-dimensions; said channel members being oriented with open faces of said U-shaped cross sections thereof facing inwardly with respect to the rectangular frame defined thereby, and dimensioned for embracing at least outer edge portions of said panel means for defining said coupling of said panel means to said lower and said side frame members, and a pair of intermediate horizontal frame members, each comprising an elongate member substantially identical in cross-sectional configuration with said horizontal and vertical frame members, one of said intermediate frame members being oriented for embracing at least a top edge part of said panel means and the other of said intermediate frame members being oriented oppositely for facing said horizontal top frame member; grill means defining an upper door portion; and means for retaining said grill means in position intermediate said upper frame member and said intermediate frame member, said grill means comprising a plurality of vertically oriented, horizontally spaced elongate rods; and wherein said retaining means comprises a pair of elongate, U-shaped retaining channel members dimensioned for embracing and overlying the respective inwardly facing surfaces of said upper frame member and said other intermediate frame member; said retaining channel members further including a plurality of spaced apart sleeves for receiving and retaining opposite end portions of said rods.

2. A door or wall construction in accordance with claim 1 wherein each said retaining channel member comprises a substantially flat elongated web surface and a pair of similar integrally depending side surfaces longitudinally co-extensive therewith and defining therewith said U-shaped cross section of said retaining channel member; and sleeve means comprising a plurality of spaced apart through bores in said web surface; the respective retaining channels being alignable so as to bring said sleeve means substantially into coaxial alignment for holding the respective rods in a substantially vertical, parallel, spaced apart orientation.

3. A door or wall construction in accordance with claim 2 wherein each said sleeve means further comprises a generally annular surface extending coaxially with said through bore and toward the associated rod for surroundingly engaging an end portion of said rod.

4. A door or wall construction in accordance with claim 1 wherein each of said sleeves comprises a through bore; and an annular, flared out portion integral with the material of the channel about said through bore.

5. A door or wall construction in accordance with claim 2, said retaining channel member further including a plurality of fastener-receiving apertures longitudinally spaced along said web surface for receiving fastener means to facilitate fastening of said retaining channel to said frame channels.

6. A door or wall panel construction comprising: vertically spaced upper and lower horizontal frame members, horizontally spaced vertical side frame members coupled with said upper and lower frame members to define a rectangular frame; panel means coupled with said lower frame member and with each of said side frame members to define a lower wall panel portion; an intermediate horizontal frame member; grill means defining an upper wall panel portion; and means for retaining said grill means intermediate said upper frame member and said other intermediate frame member; wherein said grill means comprises a plurality of vertically oriented, horizontally spaced elongate rods; and wherein said retaining means comprises a pair of elongate, U-shaped retaining channel members located for overlying the respective inwardly facing surfaces of said upper frame member and said intermediate frame member; said retaining channel members further including a plurality of spaced apart sleeves for receiving and retaining opposite end portions of said rods, each said retaining channel member being defined by a substantially flat elongate web surface and a pair of similar integrally depending side surfaces longitudinally coextensive therewith and defining therewith said U-shaped cross section of said retaining channel member, and each said spaced apart sleeves including a through bore in said web surface and a generally annular surface extending coaxially with said through bore for surroundingly engaging an end portion of a rod, the respective retaining channels being alignable so as to bring said spaced apart sleeves substantially into coaxial alignment for holding the respective rods in a substantially vertical, parallel spaced orientation.

7. A door or wall panel construction comprising: vertically spaced upper and lower horizontal frame members, horizontally spaced vertical side frame members coupled with said upper and lower frame members to define a rectangular frame; panel means coupled with said lower frame member and with each of said side frame members to define a lower wall panel portion; an intermediate horizontal frame member; grill means defining an upper wall panel portion; and means for retaining said grill means intermediate said upper frame member and said other intermediate frame member; wherein said grill means comprises a plurality of vertically oriented, horizontally spaced elongate rods; and wherein said retaining means comprises a pair of elongate, U-shaped retaining channel members located for overlying the respective inwardly facing surfaces of said upper frame member and said intermediate frame member; said retaining channel members further including a plurality of spaced apart sleeves for receiving and retaining opposite end portions of said rods, each of said sleeves comprises a through bore; and an annular, flared out portion integral with the material of the channel about said through bore.

* * * * *